Jan. 15, 1963  G. D. FENTON ETAL  3,073,009
BRAKE CABLE ASSEMBLY MACHINE
Filed June 12, 1959  11 Sheets-Sheet 8

INVENTORS
GEORGE DONALD FENTON and
HAROLD J. ELMENDORF
By Donald G. Dalton
Attorney

United States Patent Office 3,073,009
Patented Jan. 15, 1963

3,073,009
BRAKE CABLE ASSEMBLY MACHINE
George Donald Fenton, Worcester, and Harold J. Elmendorf, Holden, Mass., assignors to United States Steel Corporation, a corporation of New Jersey
Filed June 12, 1959, Ser. No. 820,012
10 Claims. (Cl. 29—33)

This invention relates to apparatus for assembling an elongated member in a conduit and more particularly for assembling the parts of a brake cable assembly. Brake cable assemblies normally include a cable which passes through a conduit having a number of fittings and springs mounted thereon. A fitting may also be applied to the ends of the cable. Prior to our invention brake cable assemblies were assembled by hand. This was a slow and tedious operation and parts were sometimes omitted and not detected by the operator so that defective assemblies were shipped to the customer.

It is therefore an object of our invention to provide apparatus for assembling an elongated member in a conduit wherein all parts must be present in the completed assembly.

Another object is to provide such a machine which will assemble brake cable assemblies rapidly and accurately with little manual labor.

These and other objects will be more apparent after referring to the following specification and attached drawings, in which:

FIGURE 16 is an enlarged view of a conveyor strap;

Figures 1, 1A, 4:
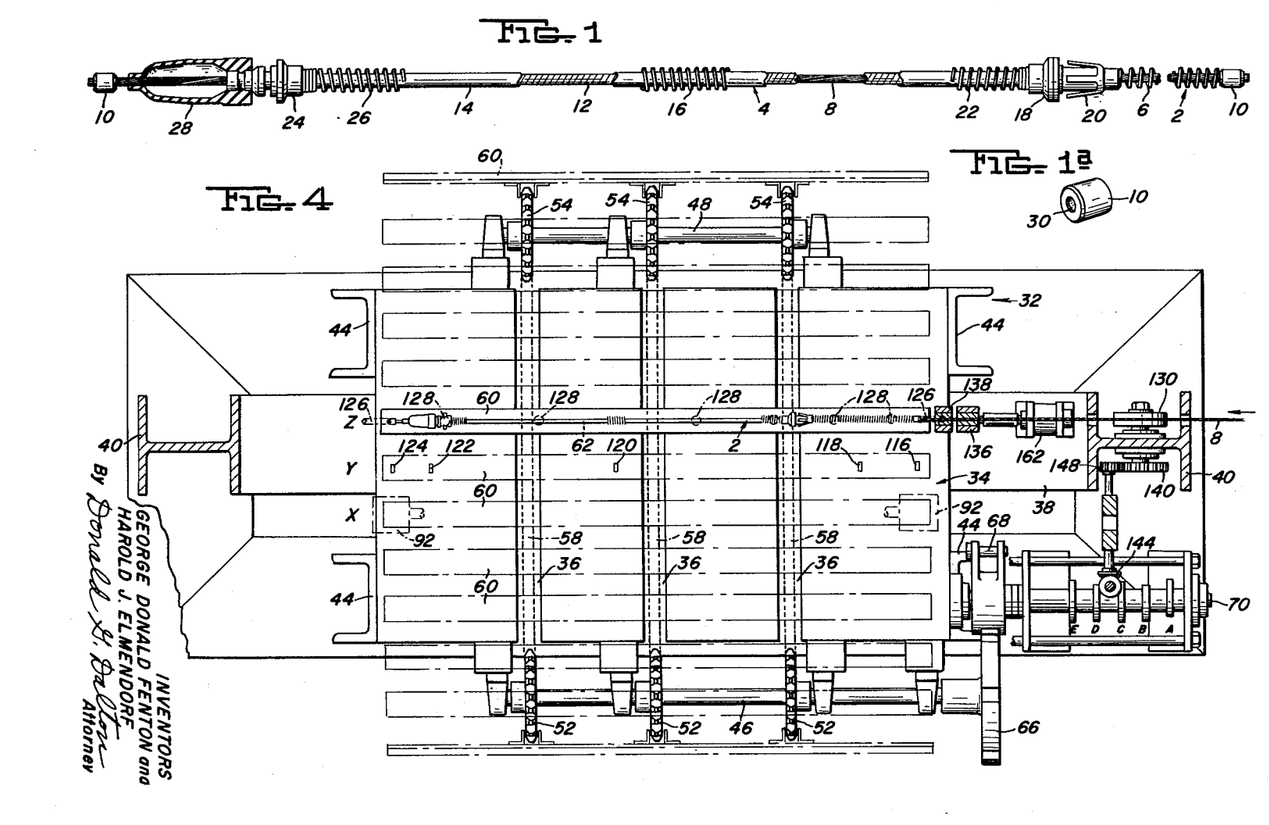
FIGURE 1 is a view of a brake cable assembly which may be assembled in the machine of our invention.
FIGURE 1a is a perspective view of one part of the brake cable assembly of FIGURE 1.
FIGURE 4 is a plan view taken at the level of the top of the conveyor of FIGURE 3.

Referring more particularly to the drawings reference numeral 2 indicates a brake cable assembly which, prior to assembly in the machine of our invention, consists of a conduit assembly 4, a spring 6, a cable or strand 8, and two sleeve terminals 10. The conduit assembly 4 consists of a spirally wound steel casing 12, a rubber sleeve 14 surrounding the steel casing 12 over most of its length, a center spring 16 surrounding the sleeve 14 at the center of the assembly, a die cast terminal 18 surrounding the casing 12 at the right end thereof as shown in FIGURE 1, a finger spring 20 attached to the terminal 18, a spring 22 within the terminal 18 and extending therefrom around the rubber sleeve 14, a die cast terminal 24 surrounding the casing at the left end thereof as shown in FIGURE 1, a spring 26 within the terminal 24 and extending therefrom around the rubber sleeve 14, and a rubber end seal 28 attached to the terminal 24. After assembly the cable 8 extends through the conduit assembly 4 with its ends extending from both ends thereof and a terminal 10 secured to each end. The spring 6 surrounds the right end of the cable between the terminal 18 and sleeve 10. As shown in FIGURE 1a the terminal sleeve 10 has an opening 30 therethrough which is chamfered at each end.

Figure 2:
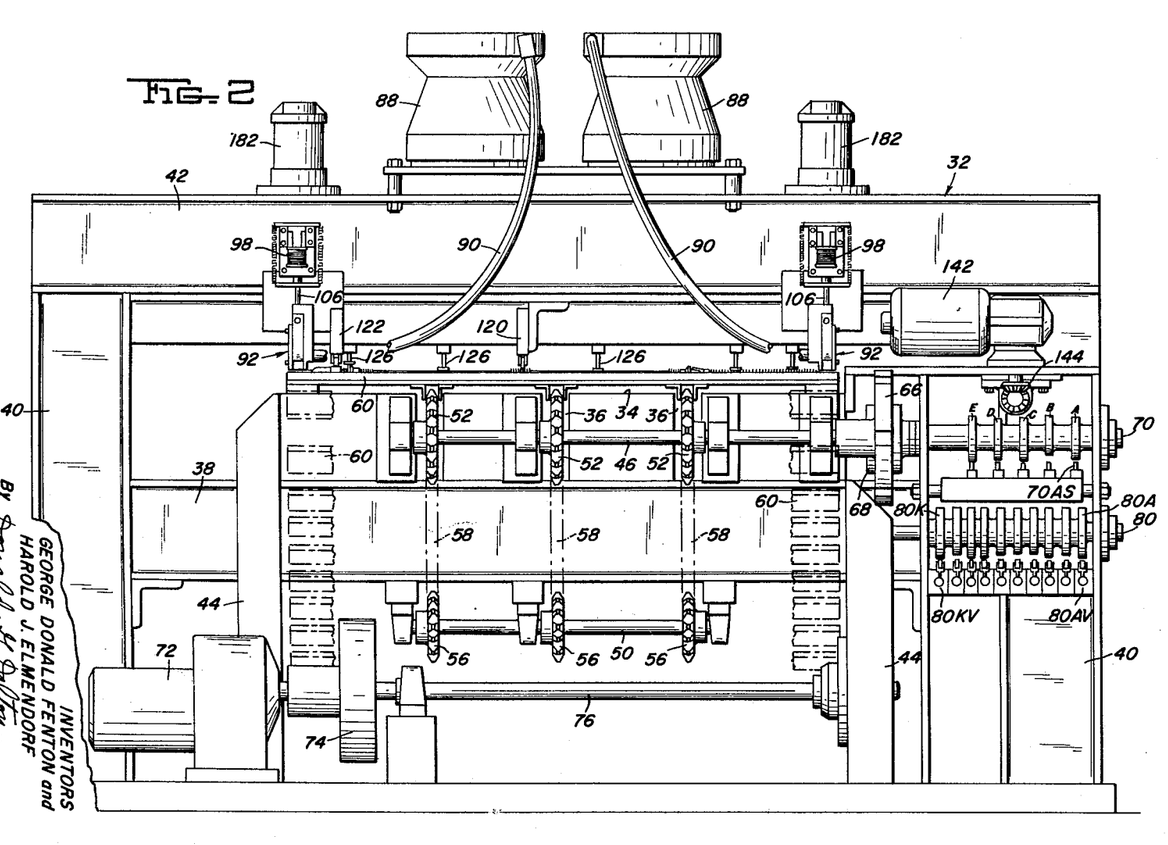
FIGURE 2 is a front elevation of the machine of our invention.

The machine of our invention includes a frame 32 having a top 34 made up of four sections as shown with a space 36 between the sections. The sections of the top 34 are supported by a longitudinal H-beam 38 which, in turn, is welded or otherwise fastened to vertical columns 40 at each end thereof. A second longitudinal H-beam 42 is supported on top of columns 40 and is welded or otherwise fastened thereto. Vertical channels 44 may be provided at the corners of the top 34. Conveyor drive shaft 46 is mounted on the front end of top 34 and conveyor shaft 48 on the rear end of top 34. A third conveyor shaft 50 is mounted on the bottom of H-beam 38. Three sprockets 52 are mounted on shaft 46 and sprockets 54 and 56 are mounted on shafts 48 and 50, respectively, in alignment with sprockets 52 and the spaces 36. A chain 58 passes around each set of sprockets 52, 54 and 56 with the chains being received in the spaces 36. A plurality of conveyor straps 60 extend between and are fastened to the chains 58 in spaced apart relationship as shown in broken lines in FIGURE 4. The top of each of the straps 60 has a groove 62 throughout its length, the smallest cross-section of which is substantially semicircular with a radius slightly greater than the radius of cable or strand 8. As best shown in FIGURE 16 the groove 62 is shaped between points A and B so as to receive a sleeve terminal 10, between points C and D to receive a spring 6, between points E and F to receive a conduit assembly 4, and between points G and H to receive a sleeve terminal 10. A slot 64 is provided in each strap 60 adjacent each end thereof. A Geneva wheel 66 is mounted on the right hand end of shaft 46 as seen in FIGURE 4 and is driven intermittently by a Geneva actuator 68 which rotates one revolution for each movement of the conveyor. The Geneva actuator 68 is mounted on a cam shaft 70 which is driven from main drive motor 72 through friction clutch 74, main drive shaft 76 and an intermediate shaft 78. An auxiliary cam shaft 80 is driven from cam shaft 70 with a ratio of unity. Feed cam shaft 82 is driven from cam shaft 70 through an intermediate shaft 84. Spaced apart cams 86 are mounted on shaft 82 one adjacent each side of the conveyor for a purpose which will appear later. The drives between the various shafts are shown as chain and sprockets, but it will be understood that gearing or any suitable drive means may be substituted therefor. Mounted on cam shaft 70 are five cams 70A, 70B, 70C, 70D and 70E as best shown in FIGURE 2. The cams 70A to 70E operate switches 70AS to 70ES, respectively. Mounted on cam shaft 80 are ten cams 80A, 80B, 80C, 80D, 80E, 80F, 80G, 80H, 80J and 80K which control the operation of 3-way valves 80AV to 80KV, respectively.

Figure 8:
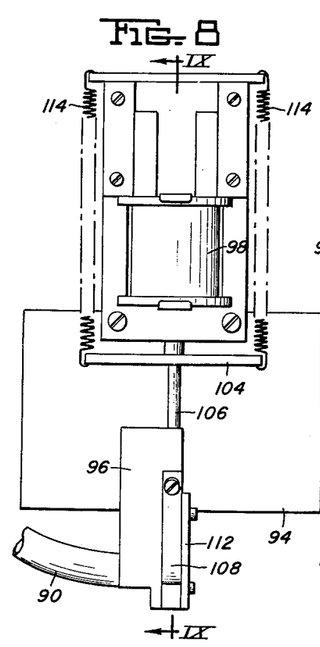
FIGURE 8 is a front elevation of a dispenser for a part of the brake cable assembly.
Figure 9:
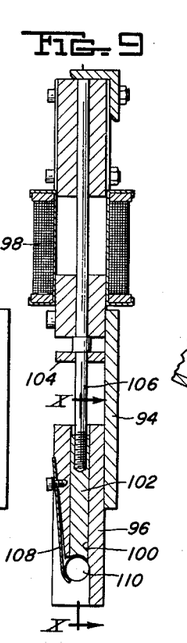
FIGURE 9 is a sectional view taken on the line IX—IX of FIGURE 8.
Figure 10:
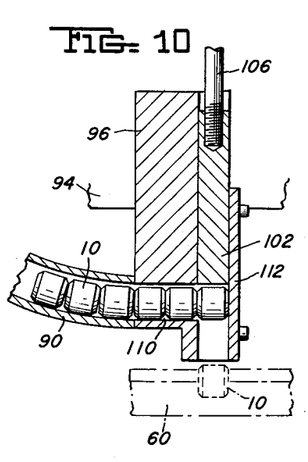
FIGURE 10 is an enlarged sectional view taken on the line X—X of FIGURE 9.

A pair of standard vibratory feeders 88, such as manufactured by Parts Feeders Inc. of Hartford, Connecticut, are mounted on top of the H-beam 42. A feed tube 90 is connected to each of the feeders 88. Each of the tubes 90 receives the terminals 10 axially and terminates at its lower end in a parts dispenser 92 mounted just above the conveyor. As best shown in FIGURES 8, 9 and 10 the parts dispenser 92 consists of a plate 94 connected to the beam 42. A block 96 and solenoid 98 are attached to the plate 94. The block 96 has a vertical groove 100 therein for receiving a plunger 102. A plate 104 is attached to the plunger 102 by means of threaded rod 106. A spring 108, having a curved lower end is attached to block 96 with its lower end adjacent an opening 110 in the block 96. The conduit or tube 90 terminates in opening 110 and a terminal 10 passes through opening 110 and bears against a plate 112 attached to block 96. The spring 108 normally holds the terminal from dropping, but when solenoid 98 is energized it moves the plunger 102 downwardly and feeds the terminal 10 into groove 62 of the strap 60 located at station X. When the solenoid 98 is deenergized springs 114, attached to plate 104 and the solenoid frame, return the plunger 102 to its normal upper position. It will be understood that a single sleeve terminal 10 will be fed from each dispenser 92 for each movement of plunger 102. The terminals 10 may be fed in other ways and if desired could be placed in the feed tubes 90 by hand.

A plurality of micro-switches 116, 118, 120, 122 and 124 are suspended from the beam 42 directly above the groove 62 of the strap 60 located at station Y so as to detect the absence of any part of the brake cable assembly 2. If any part is missing the corresponding switch will remain open and give a signal in a manner to be described hereinafter.

A plurality of hold down air cylinders 126 are suspended from the beam 42 and have hold-down pads 128 at their lower ends which bear against the part of the brake cable assembly on the strap 60 located at station Z so as to hold the parts securely in assembly position. The cylinders 126 operate together during the dwell-time of the conveyor and are controlled in a manner to be described hereinafter.

Figure 11:
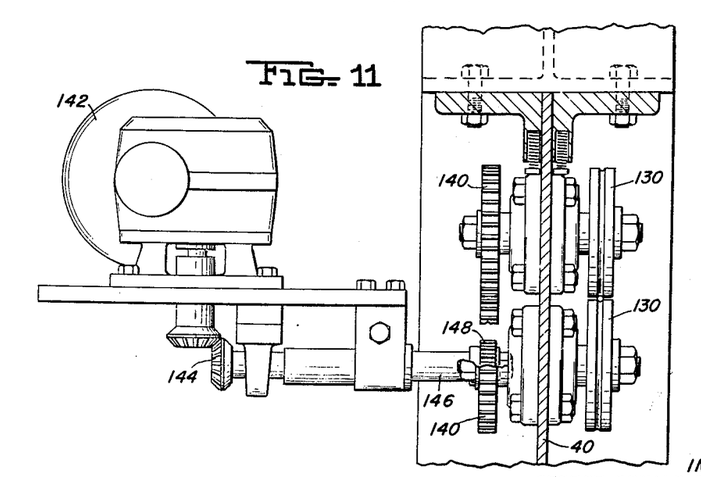
FIGURE 11 is an enlarged plan view of the cable feeding mechanism.
Figure 12:
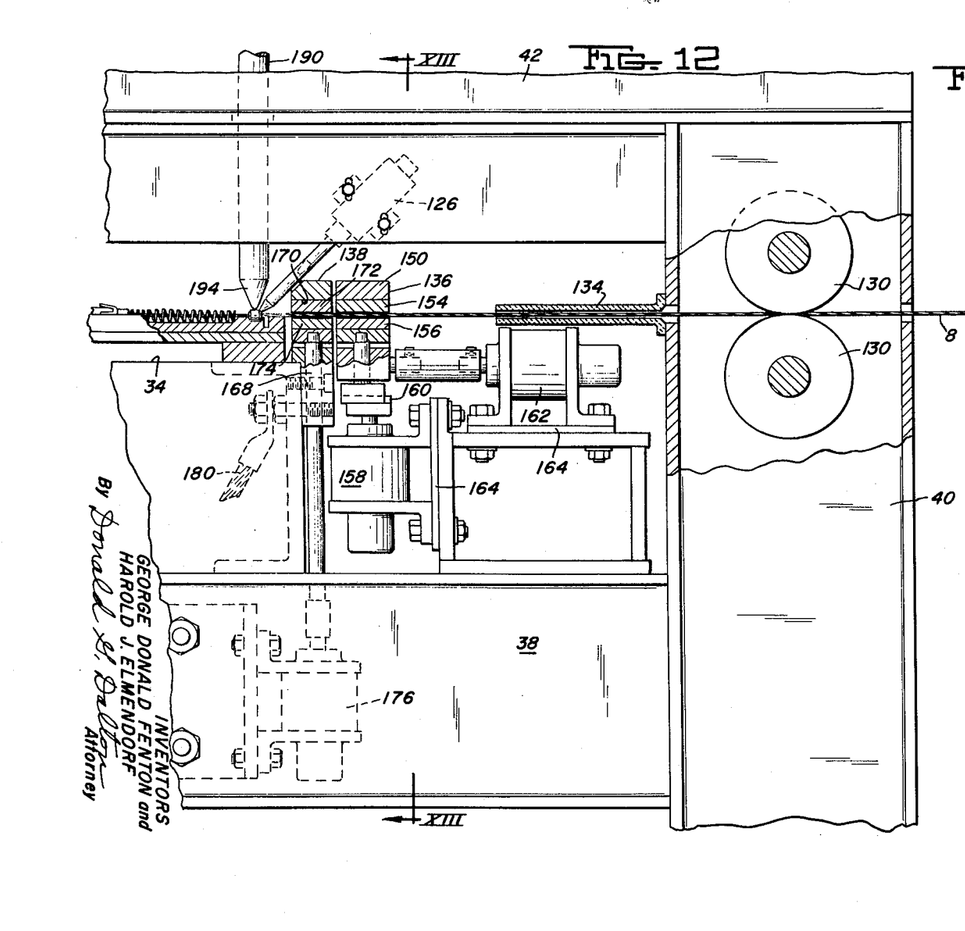
FIGURE 12 is a view, partly in section, showing the cable feeding mechanism in elevation.
Figure 13:
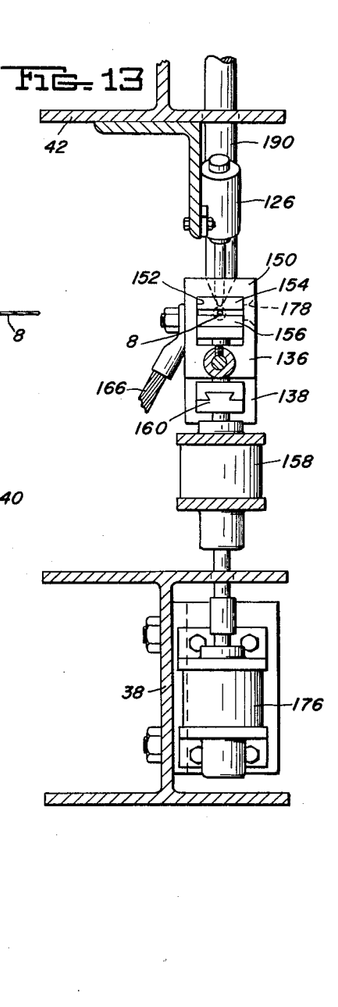
FIGURE 13 is a view taken on the line XIII—XIII of FIGURE 12.

A pair of driven feed rolls 130 are mounted on the frame 32 to the right of the conveyor as viewed in FIGURE 4. As best shown in FIGURES 11, 12 and 13 strand 8 is fed from a reel (not shown) through rolls 130, insulated guide member 134, movable burn-off die 136, fixed burn-off die 138, and then through the parts of the cable assembly. The rolls 130 are coupled together by spur gears 140 and are driven from motor 142 through miter gears 144, drive shaft 146 and pinion 148 mounted on shaft 146. The movable die 136 includes a die holder 150 having an opening 152 therein for receiving a fixed upper jaw 154 and a movable lower jaw 156. The jaw 156 is connected to the piston rod of a vertical cylinder 158 through a dove-tailed coupling 160. The holder 150 is connected to the piston rod of a horizontal cylinder 162. Insulation 164 insulates the parts of die 136 from the machine frame. Power is supplied to die 136 by means of power cable 166. The stationary die 138 includes a die holder 168 having an opening 170 therein for receiving a fixed upper jaw 172 and a movable lower jaw 174. The jaw 174 is connected to the piston rod of a vertical cylinder 176 mounted on the machine frame. The die holder 168 has a side slot 178 communicating with opening 170. The parts of die 138 are not insulated from the machine frame. A power cable 180 is connected to the holder 168. In order to cut the strand 8, the jaws 156 and 174 are moved upwardly by supplying air to the lower part of cylinders 158 and 176 to clamp the strand in position and power is then applied to the dies through power cables 166 and 180. This causes current to flow through strand 8 between the dies 136 and 138. While current is still being applied, air is applied to the front end of cylinder 162, thus placing the strand under tension. This causes the strand to neck down and fuses the individual wires together so that the wires will not unravel and the strand can be readily fed into the parts of the brake cable assembly. The jaws of die 138 are then opened wide enough to permit passage of the strand 8 therefrom through slot 178 when the conveyor starts moving. The jaws of die 136 also open slightly to permit axial feeding of strand 8 to the next assembly.

Figure 3:
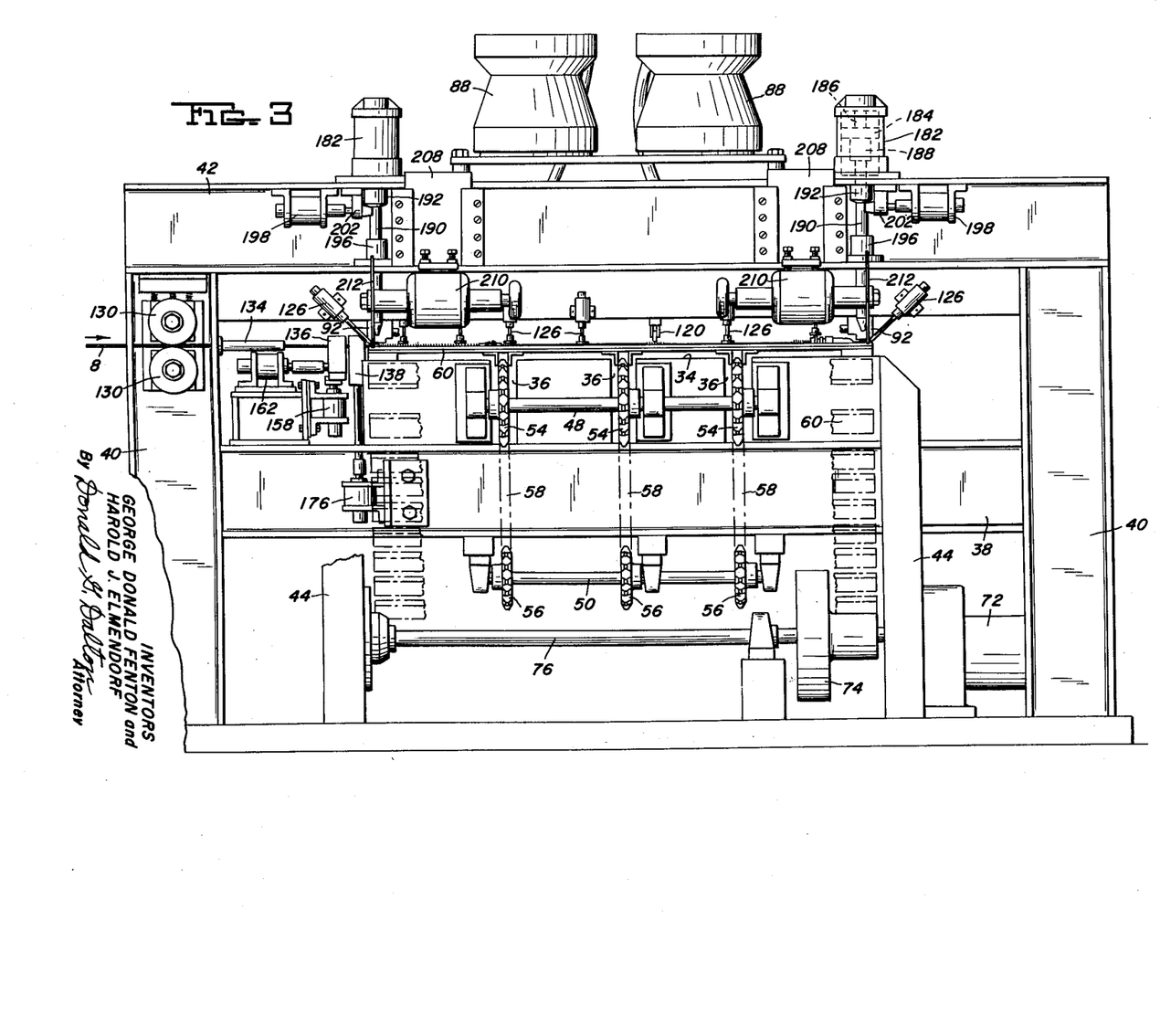
FIGURE 3 is a rear elevation of the machine of FIGURE 1.
Figure 5:
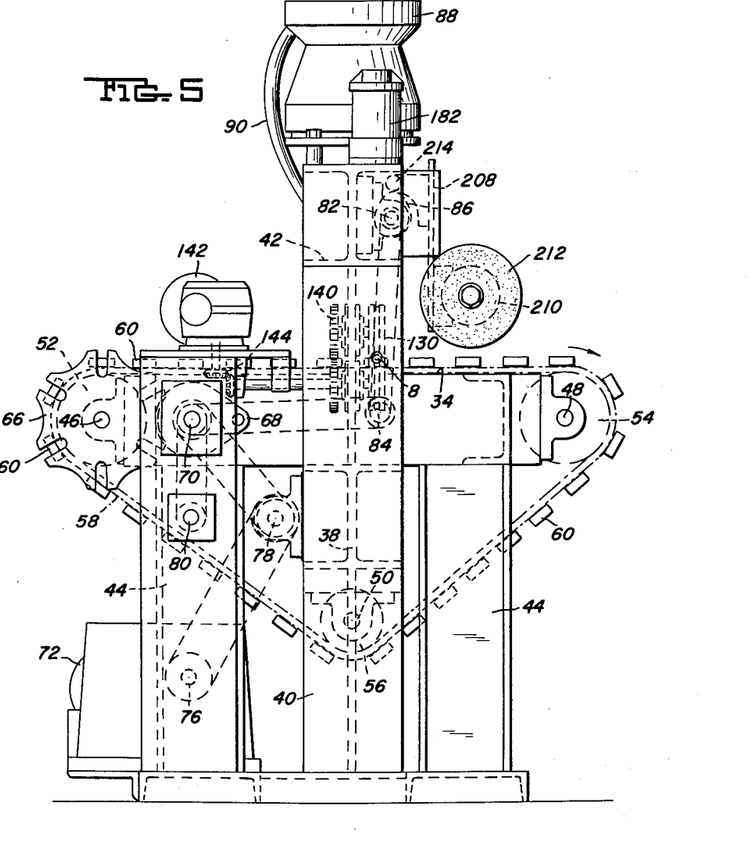
FIGURE 5 is an end elevation looking toward the right end of FIGURE 2.
Figure 6:
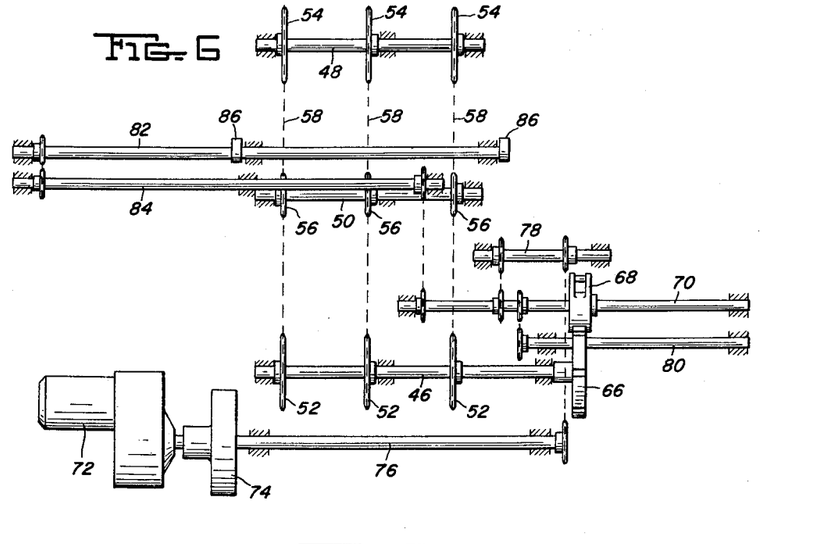
FIGURE 6 is a schematic plan view showing the principal drives of the machine.
Figure 7:
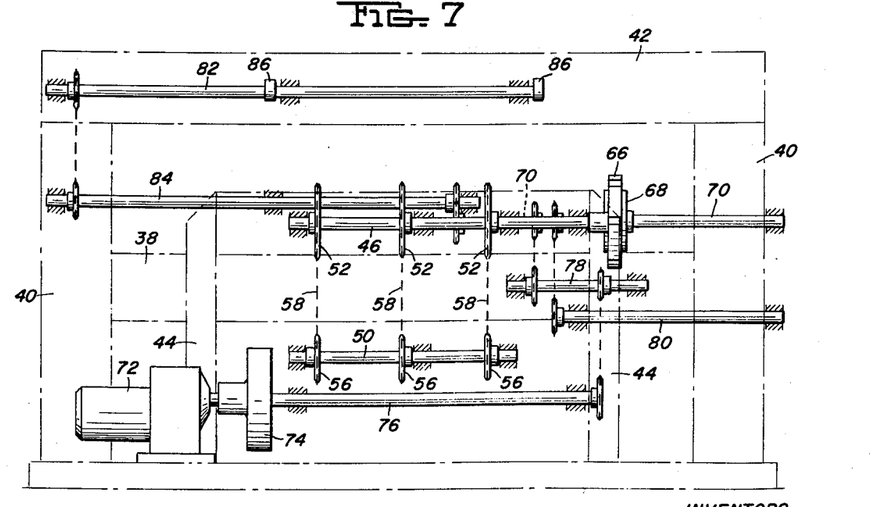
FIGURE 7 is a front elevation of the drives of FIGURE 6.
Figure 14:
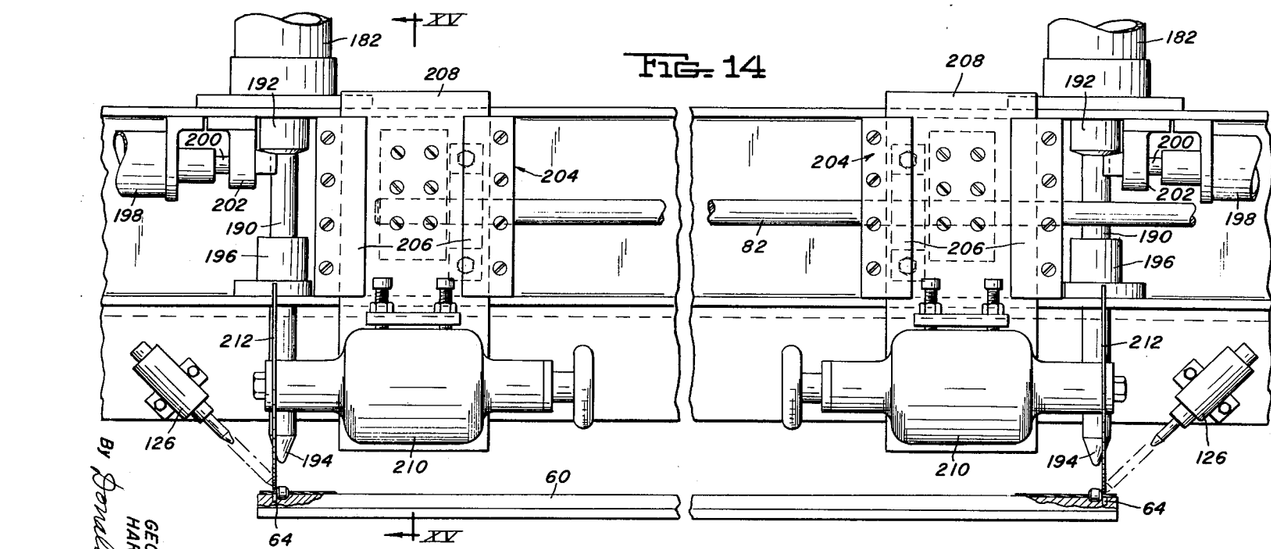
FIGURE 14 is an enlarged fragmentary rear elevation of the machine.
Figure 15:
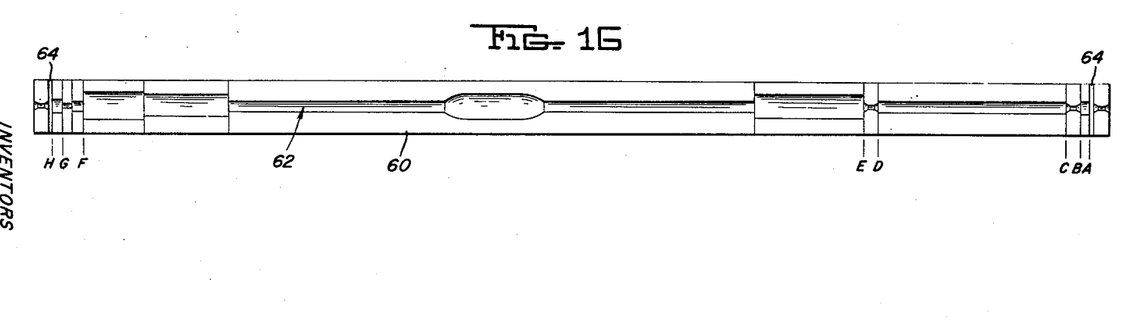
FIGURE 15 is a view taken on the line XV—XV of FIGURE 14.

As best shown in FIGURES 3, 14 and 15 a pair of vertical cylinders 182 are mounted on the back of beam 42 one adjacent each side of the conveyor. Each of the cylinders 182 has a piston 184 therein which has a stop 186 on its upper end, a stop 188 on its lower end and a piston rod 190 extending downwardly through the stop 188. A release collar 192 is provided on the rod 190 intermediate its length and a staking point 194 is provided on its lower end. A guide 196 is mounted on the machine frame so as to provide support for the rod 190. A horizontal cylinder 198 is mounted on the beam 42 and has a release slide 200 attached to its piston rod and which is guided in a sleeve 202. The parts are shown in normal position and when air is delivered to the top of cylinder 182 it will accumulate in the space provided by stop 186 until its pressure builds up to a predetermined pressure. Release slide is then withdrawn permitting the rod 190 to move downwardly with the staking point 194 to strike sleeve terminal 10 and temporarily secure it to the strand 8. The stop 188 prevents the point 194 from moving downwardly and striking the strap 60 if a terminal 10 is missing. The rod 190 is then raised and the slide 200 moved forwardly under the collar 192.

As best shown in FIGURES 14 and 15 a pair of brackets 204 are attached to the back of beam 42. Each bracket 204 provides a guide 206 for a slide 208 having a motor 210 on its lower end for driving an abrasive cut-off wheel 212. One of the cut-off wheels 212 is mounted in line with each slot 64 and is directly above the slot in the strap 60 in the second station beyond position Z. A cam follower 214 is mounted on each slide 208. The cam shaft 82 makes one revolution per one movement of the conveyor and is timed to return the slide 208 to its top position during indexing of the conveyor from one position to the next. The slide 208 moves downwardly under its own weight when the cam 86 rotates from the position shown to cut off the ends of the strand 8.

Figure 17:
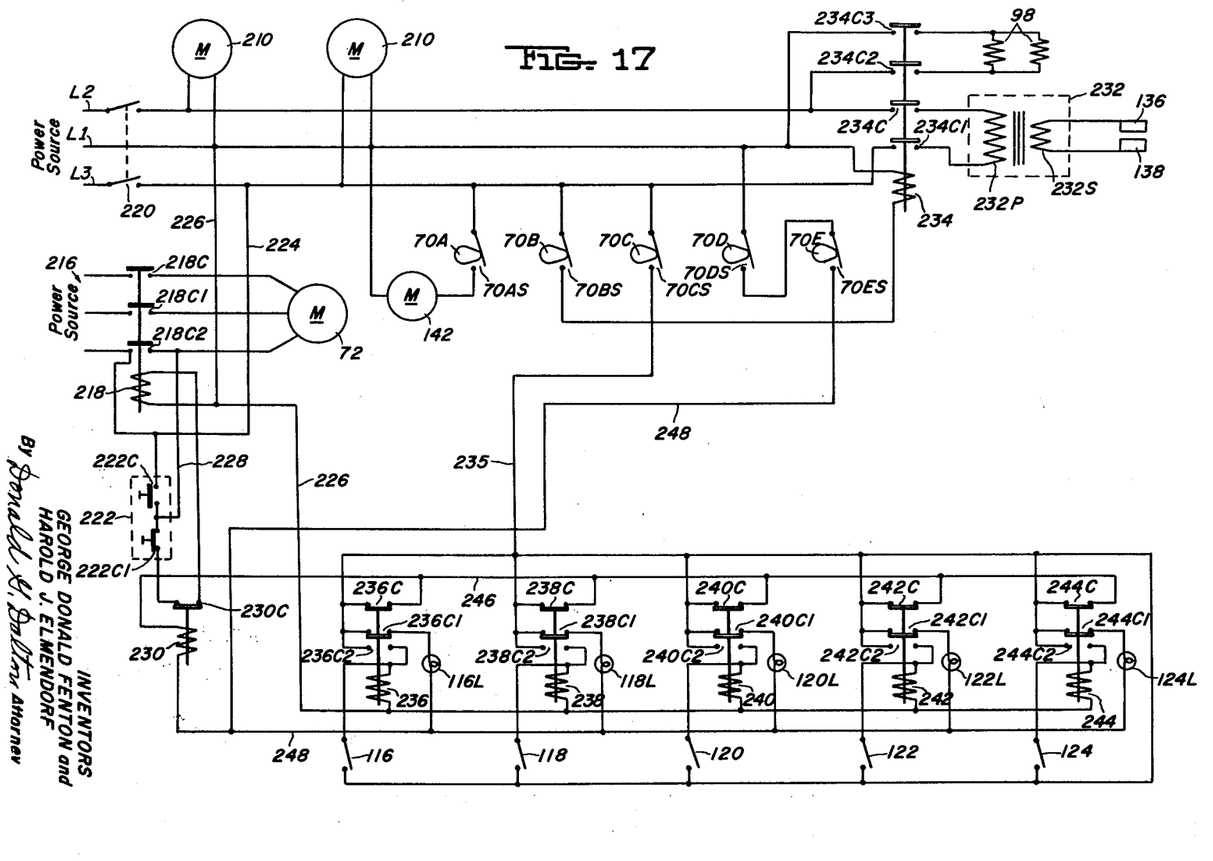
FIGURE 17 is a schematic electrical wiring diagram of the controls of the machine.

FIGURE 17 shows the electrical wiring diagram for our machine, but auxiliary switches, meters, overload protective devices, etc. are omitted for simplicity since they form no part of the invention. Power for operating motor 72 is provided from a 440 v., 60 cycle, 3-phase power source 216. A relay coil 218 is provided with normally open contacts 218C, 218C1 and 218C2 which controls flow of power to the motor 72. Power for driving the motors 210 is supplied from a 230 v., 60 cycle power source L1, L2 and L3. A manually operable switch 220 is provided in lines L2 and L3. A start-stop switch 222 having a normally open start contact 222C and a normally closed stop contact 222C1 controls flow of current to coil 218. A wire 224 connects line L3 to contacts 218C2 and 222C. A wire 226 connects coil 218 to ground L1. Coil 218 is connected to line L3 through wire 224 and then either through contact 218C2, wire 228, contact 222C1 and normally closed contact 230C of relay 230 or from wire 224 through contacts 222C, 222C1 and 230C. Strand feed motor 142 receives power from lines L1 and L3 through switch 70AS, the operation of which is controlled by cam 70A. Power for the burn-off dies 136 and 138 is provided from secondary 232S of transformer 232 having its primary 232P connected to lines L2—L3 through normally open contacts 234C and 234C1 of relay coil 234. Power to solenoids 98 is delivered from lines L1—L2 through normally open contacts 234C2 and 234C3. Relay coil 234 is connected to lines L1 and L2 through switch 70BS, the operation of which is controlled by cam 70B. Relay coil 230 is connected to line L3 through switch 70CS, the operation of which is controlled by cam 70C, wire 235, normally closed contacts 236C, 238C, 240C, 242C and 244C connected in parallel, and wire 246. Coil 230 is connected to ground L1 through wire 243, switch 70ES, the operation of which is controlled by cam 70E, and switch 70DS, the operation of which is controlled by cam 70D. Contact 236C is opeated by relay coil 236 which also has a normally closed contact 236C1 and a normally open contact 236C2. Conatct 238C is operated by relay coil 238 which also has a normally closed contact 238C1 and a normally open contact 238C2. Contact 240C is operated by relay coil 240 which also has a normally closed contact 240C1 and a normally open contact 240C2. Contact 242C is operated by relay coil 242 which also has a normally closed contact 242C1 and a normally open contact 242C2. Contact 244C is operated by relay coil 244 which also has a normally closed contact 244C1 and a normally open contact 244C2. Coils 236, 238, 240, 242 and 244 are connected in parallel to ground L1 through wire 226. Coil 236 is connected to line L3 through switch 70CS, wire 235 and either of two parallel circuits, one through switch 116 and the other through contact 236C2. Coils 238, 240, 242 and 244 are likewise connected to line L3 through their associated switches 118, 120, 122 and 124, respectively, or through their associated contacts 238C2, 240C2, 242C2 and 244C2, respectively. Indicator lights 116L, 118L, 120L, 122L and 124L are connected to ground L1 through switches 70DS and 70ES and wire 248. Indicator lights 116L, 118L, 120L, 122L and 124L are connected to wire L3 through switch 70CS, wire 235 and associated contacts 236C1, 238C1, 240C1, 242C1 and 244C1, respectively.

Figure 18:
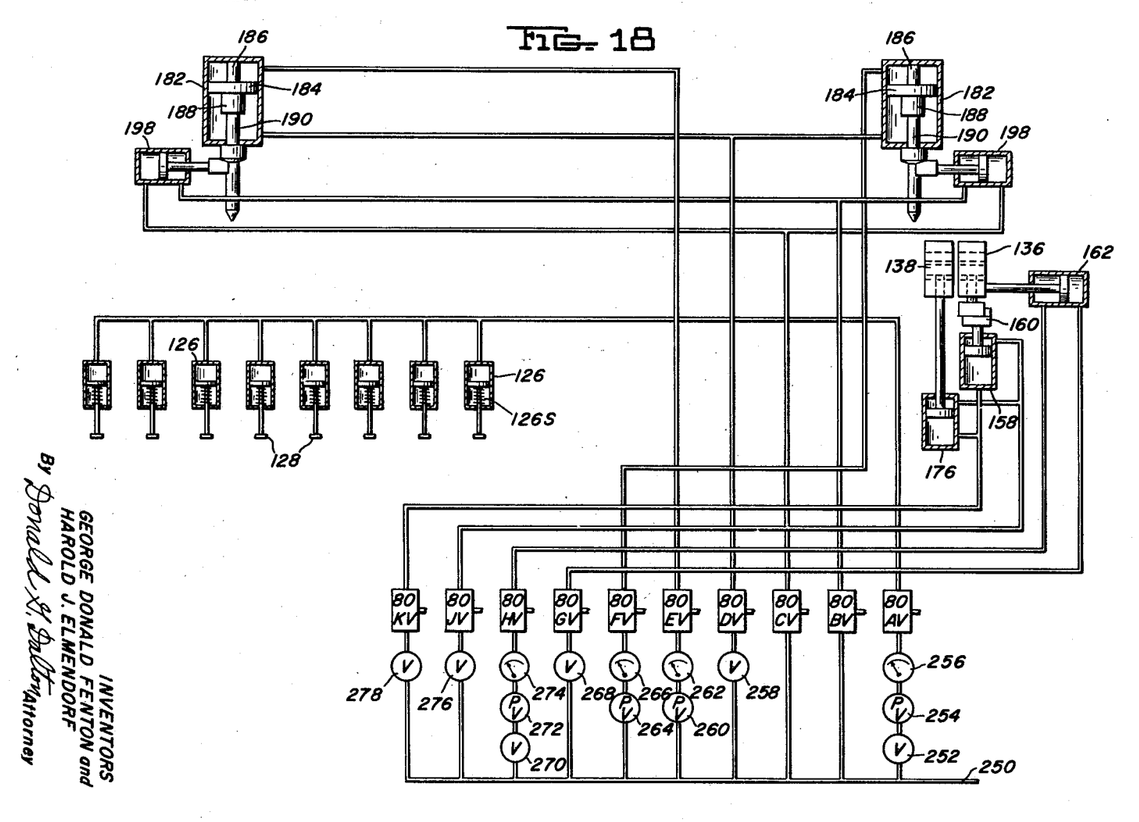
FIGURE 18 is a schematic diagram of the pneumatic system of the machine.

FIGURE 18 shows schematically the pneumatic system for our machine. Three-way valves 80AV, 80BV, 80CV, 80DV, 80EV, 80FV, 80GV, 80HV, 80JV and 80KV are operated by cams 80A, 80B, 80C, 80D, 80E, 80F, 80G, 80H, 80J and 80K, respectively. An air line 250 connected to an air compressor or other source of pressure (not shown) delivers air to the various valves. Air is delivered to the parts clamp cylinders 126 from air line 250 through flow control valve 252, pressure regulator 254, gauge 256 and valve 80AV. To release the part clamps the valve 80AV is operated to shut off pressure from the line 250 and to exhaust the air to atmosphere with springs 126S within the cylinders 126 returning the clamps to original position. Air is delivered to the return side of cylinders 198 through valve 80BV with air being exhausted from the opposite end through valve 80CV. Air is delivered to the feed side of cylinders 198 through valve 80CV with air being exhausted from the opposite end through valve 80BV. Air is delivered to the lower side of cylinders 182 through valves 80DV with air from the top being exhausted to atmosphere through valves 80EV and 80FV. Air is delivered to the top side of cylinders 182 through valves 80EV and 80FV with air from the bottom being exhausted to atmosphere through valve 80DV. A flow control valve 258 is located in line 250 leading to valve 80DV. A pressure regulator 260 and gauge 262 are located in line 250 leading to valve 80EV. A flow control valve 264 and gauge 262 are located in line 250 leading to valve 80FV. Separate control valves 80EV and 80FV are used to control flow to cylinders 182 so that the air pressure can be separately controlled. Air is delivered to the feed side of cylinder 162 through valve 80GV and exhausted to atmosphere through valve 80HV. Air is delivered to the return side of cylinder 162 through valve 80HV and exhausted to atmosphere through valve 80GV. Air is delivered to valve 80GV through control valve 268 and to valve 80HV through control valve 270, pressure regulator 272 and gauge 274. Air is delivered to the return side of cylinders 158 and 176 through valve 80JV and exhausted to atmosphere through valve 80KV. Air is deliver to the feed or clamping side of cylinders 158 and 176 through valve 80KV and exhausted to atmosphere through valve 80JV. Control valves 276 and 278 control air flow to valves 80JV and 80KV, respectively.

The operation of our machine is as follows: Assume that the machine has been shut down temporarily and that parts are in the conveyor straps 60 at station X and beyond. The operator will place conduit assemblies 4 and springs 6 in the grooves 62 of the straps 60 at station X or prior to their reaching station X. To start the machine in operation, the operator first closes switch 220 which starts grinder motors 210 in operation and then momentarily closes contact 222C. This completes a circuit to coil 218 which locks itself in through holding contact 218C2. Energization of coil 218 also starts main motor 72 in operation. This, through Geneva wheel 66 and actuator 68, causes the conveyor straps 60 to move step by step from one station to the next. Cam shafts 70, 80 and 82 are also caused to rotate one revolution for each movement of the conveyor. Assuming that the time for completing one cycle of operation is indicated by 360°, the conveyor moves during the period between 0 and 90° and is stationary during the remaining part of the cycle. At some time during the conveyor movement switches 70CS, 70DS and 70ES will be closed. Switch 70AS will be closed between 95 and 170°, switch 70BS between 285 and 335°, switch 70CS between 185° and 65°, switch 70DS between 35 and 70° and switch 70ES between 15 and 50°. Switches 116, 118, 120, 122 and 124 will always be open between 0 and 90° and will be closed between 90 and 360° when the parts are in place on the strap 60 at station Y. Valves 80CV, 80DV, 80GV, 80HV and 80JV will be open for flow of pressurized air therethrough some time during the conveyor movement. Valve 80AV will be open between 95 and 330°, valve 80BV between 305 and 350°, valve 80CV between 350 and 30°, valve 80DV between 330° and 30°, valves 80EV and 80FV between 210° and 320°, valve 80GV between 15 and 190°, valve 80HV between 285 and 10°, value 80JV between 350 and 45° and valve 80KV between 260 and 320°. Cam 86 will be in the position shown at 90°.

When the conveyor stops between movements valve 80AV will open to pressure, thus clamping the parts on the conveyor strap at station Z and switch 70AS will close, thus energizing motor 142 to feed strand 8 through the assembly. The feeding of strand continues to 170° which, for a given assembly, will result in the correct length of strand. At 260° valve 80KV will close, thus clamping strand 8 in dies 136 and 138. At 285° switch 70BS will close, thus energizing relay coil 234 to close its contacts. This delivers current to burn off dies 136 and 138 and also to solenoids 98. Energization of solenoids 98 feed terminals 10 to the strap 60 at station X. At 335° switch 70BS opens, thus deenergizing solenoids 98 and disconnecting the current to dies 136 and 138. In the meantime, at 285° valve 80HV opens to pull die 136 away from die 138. This results in separation of the strand 8 as described above. When the conveyor again moves valve 80HV will close and valve 80GV will open to move die 136 back to normal position. At 320° valve 80KV will close and at 350° valve 80JV will open, thus separating the jaws of dies 136 and 138. At 210° valves 80EV and 80FV will open and remain open until 320°, prior to which time the air pressure will have built up to its maximum. Then at 305°, when valve 80BV opens and retracts slide 200, the staking points 194 will be driven against the terminals 10 at station Z to fasten the terminals to the strand 8. Thus this arrangement functions as an accumulator to build up the air pressure and strike a hammer blow. The valve 80DV will open at 330° to raise the staking points 194 and at 350° the valve 80CV will open to move the slides 200 into their inward position. This completes the operation at station Z so that when valve 80AV closes at 330° the hold downs 126 will rise and release the conveyor for movement.

When the conveyor stops, movement of slides 208 is permitted by rotation of cam 86, thus permitting the wheels 212 to cut off the ends of strand 8 extending beyond terminals 10. Further rotation of the cam raises the slides 208 so that the wheels 212 start to rise as the conveyor starts moving.

Switch 70CS closes at 185° and remains closed to 65°, thus energizing coils 236 to 244 through switches 116 to 124 and through holding contacts 236C2 to 244C2, respectively. Nothing happens unless a part is missing at station Y.

The machine is now ready for another cycle of movement.

Assuming that a terminal 10 is missing at station Y under switch 116. Switch 116 will then remain open from 90 to 360°. When this occurs relay coil 236 will not be energized at any time during the cycle. However, when switches 70CS, 70DS and 70ES are all closed between 35 and 50° of the next cycle a circuit will be made through light 116L warning the operator as to which part is missing. At the same time a circuit is completed through coil 230, thus opening its contact 230C. This de-energizes coil 218 and stops the conveyor by deenergizing motor 72. Two switches 70DS and 70ES are used in series so as to control the duration of the power pulse which stops the machine.

The invention has been described as assembling one type of brake cable assembly but it will be understood that it may be used to assemble any number of parts including a conduit and an elongated member passing through the conduit.

While one embodiment of our invention has been shown and described, it will be apparent that other adaptations and modifications may be made without departing from the scope of the following claims.

We claim:

1. Apparatus for assembling a cable in a flexible conduit having variable outside dimensions along its length comprising an endless conveyor rotatable about a generally horizontal axis and having upper and lower runs, said conveyor including means defining a plurality of longitudinally extending grooves, each of said grooves having a length substantially the length of said flexible conduit and having variable cross-sectional dimensions so as to receive and support a flexible conduit along its length with the axis of the flexible conduit substantially straight, an assembly station at the upper run of the conveyor, clamping means associated with said conveyor at said feeding station adapted to exert a downward pressure on a conduit in said grooves at said feeding station at a plurality of positions along its length, means for moving the conveyor step by step past said assembly station, and means mounted adjacent one side of the conveyor for feeding a cable through the clamped conduit on said conveyor member at said assembly station.

2. Apparatus for assembling a cable according to claim 1 including means associated with said cable feeding means for automatically stopping feed of said cable after a predetermined length of cable has been fed, and means mounted on the exit side of said feeding means to burn the fed cable to the desired length and fuse the wires of the strand together.

3. Apparatus for assembling a cable according to claim 2 including means for automatically stopping movement of said conveyor if the conduit is missing at the station preceding said assembly station, and means mounted adjacent each side of the conveyor for cutting off the burnt ends of said cable at a station subsequent to said assembly station.

4. Apparatus for assembling a brake cable assembly including a cable and elongated hollow members, which apparatus comprises and endless rotatable about a generally horizontal axis and having upper and lower runs, a plurality of members on said conveyor for receiving and supporting the said hollow members substantially along the full length thereof with the axes of said hollow members in alignment, an assembly station at the upper run of the conveyor, means for moving the conveyor step by step past said assembly station, means for automatically stopping movement of said conveyor if a part is missing at a station preceding said assembly station, clamp means for holding the hollow members in place on said conveyor member at said assembly station, means mounted adjacent one side of the conveyor for feeding a cable through the hollow members in said conveyor member at said assembly station, means associated with said cable feeding means for automatically stopping feed of said cable after a predetermined length of cable has been fed, means mounted on the exit side of said feeding means to burn the fed cable to the desired length and fuse the wires of the strand together, means mounted adjacent said conveyor for fastening one of said hollow members to said cable at said assembly station, and means mounted adjacent each side of the conveyor for cutting off the burnt ends of said cable at a station subsequent to said assembly station.

5. Apparatus for assembling a cable within a plurality of hollow members comprising an endless conveyor rotatable about a generally horizontal axis and having upper and lower runs, said conveyor including means defining a plurality of longitudinally extending grooves each adapted to receive and support said hollow members in axial alignment, an assembly station at the upper run of the conveyor, means for moving the conveyor step by step past said assembly station, means clamping said hollow members in their associated groove, and means mounted adjacent one side of the conveyor for feeding a cable through the hollow members on said conveyor when the members are at said assembly station.

6. Apparatus for assembling a cable according to claim 5 including means associated with said cable feeding means for automatically stopping feed of said cable after a predetermined length of cable has been fed, and means mounted on the exit side of said feeding means to burn the fed cable to the desired length and fuse the wires of the strand together.

7. Apparatus for assembling a cable according to claim 6 including means for automatically stopping movement of said conveyor if one of said hollow members is missing at a station preceding said assembly station.

8. Apparatus for assembling a cable according to claim 7 including means mounted adjacent each side of the conveyor for cutting off the burnt ends of said cable at a station subsequent to said assembly station.

9. Apparatus for assembling a brake cable assembly including a cable and elongated hollow members, which apparatus comprises an endless conveyor rotatable about a generally horizontal axis and having upper and lower runs, said conveyor including a plurality of support members, each member having a longitudinally extending groove adapted to receive and support said hollow members in an axially aligned position, an assembly station at the upper run of the conveyor, means mounted adjacent said conveyor for feeding at least part of said hollow members into said grooves at a location preceding said assembly station, means for moving the conveyor step by step past said assembly station, means for automatically stopping movement of said conveyor if one of said hollow members is missing, means mounted adjacent said conveyor to clamp said hollow members in their associated groove at said assembly station, and means mounted adjacent one side of the conveyor for feeding cable through the hollow members at said assembly station.

10. Apparatus according to claim 9 including means associated with said cable feeding means for automatically stopping fed of said cable after a predetermined length of cable has been fed, means mounted on the exit side of said feeding means to burn the fed cable to the desired length and fuse the wires of the strand together, and means mounted adjacent said conveyor for fastening a part of said assembly to said cable at said assembly station.

References Cited in the file of this patent

UNITED STATES PATENTS

| | | |
|---|---|---|
| 799,201 | Slocum | Sept. 12, 1905 |
| 878,805 | Keller | Feb. 11, 1908 |
| 1,702,229 | Moulton | Feb. 12, 1929 |
| 1,939,038 | Bower | Dec. 12, 1933 |
| 2,063,798 | Firth | Dec. 8, 1936 |
| 2,302,182 | Bucknam | Nov. 17, 1942 |
| 2,345,314 | Anderson | Mar. 28, 1944 |
| 2,359,532 | Searle | Oct. 3, 1944 |
| 2,489,377 | Hendrixson | Nov. 29, 1949 |
| 2,688,133 | Berg | Sept. 7, 1954 |

UNITED STATES PATENT OFFICE
CERTIFICATE OF CORRECTION

Patent No. 3,073,009

January 15, 1963

George Donald Fenton et al.

It is hereby certified that error appears in the above numbered patent requiring correction and that the said Letters Patent should read as corrected below.

Column 6, line 3, for "deliver" read -- delivered --; column 8, line 2, for "and endless" read -- an endless conveyor --; same column, line 75, for "fed" read -- feed --.

Signed and sealed this 27th day of August 1963.

(SEAL)
Attest:

ERNEST W. SWIDER
Attesting Officer

DAVID L. LADD
Commissioner of Patents